United States Patent Office 3,400,134
Patented Sept. 3, 1968

3,400,134
PREPARATION OF TETRACYANO-1,4-DITHIIN
Howard E. Simmons, Jr., Wilmington, Del., assignor to E. I. du Pont de Nemours and Company, Wilmington, Del., a corporation of Delaware
No Drawing. Original application Oct. 1, 1958, Ser. No. 764,516. Divided and this application May 5, 1966, Ser. No. 547,781
1 Claim. (Cl. 260—327)

ABSTRACT OF THE DISCLOSURE

Tetracyano-1,4-dithiin can be made by reacting 1,2-disodiothioethylene with perchloryl fluoride in an anhydrous liquid medium. Tetracyano-1,4-dithiin is useful as a chemical intermediate for the production of dyestuffs by reaction with aromatic or heterocyclic amines or azomethines, as an insecticide and for the production of tetracyanothiophene which is formed by pyrolysis of the dithiin.

---

This application is a division of my copending application Ser. No. 764,516, filed Oct. 1, 1958, now abandoned.

This invention relates to, and has as its principal objects provision of, the novel compound tetracyano-1,4-dithiin and the preparation and pyrolysis thereof.

Tetracyano-1,4-dithiin has the formula

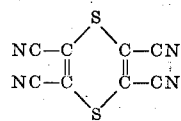

This compound can also be named 1,4-dithia-2,3,5,6-tetracyanocyclohexa-2,5-diene; however, in accordance with the accepted nomenclature of heterocyclic compounds (see the Ring Index by Patterson and Capell, 1940), tetracyano-1,4-dithiin is acceptable and will be so used herein.

The novel compound of this invention is prepared by its process aspect which comprises contacting 1,2-dicyano-1,2 - disodiothioethylene, NaS—C(CN)=C(CN)—SNa, with perchloryl fluoride, ClO$_3$F, in an anhydrous, liquid reaction medium which is at least a partial solvent for the reactants and is essentially unreactive towards them. This method yields tetracyano-1,4-dithiin as essentially the sole organic reaction product.

Another process aspect of this invention is the preparation of tetracyanothiophene from tetracyano-1,4-dithiin by pyrolyzing it at a temperature in the range of 200–250° C., whereby one of the sulfur atoms is removed from the ring, leaving tetracyanothiophene as the sole organic product.

In the preparation of tetracyano-1,4-dithiin, the starting material 1,2-dicyano-1,2-disodiothioethylene (or disodium dimercaptomaleonitrile) is prepared as described by Bahr and Schleitzer, Ber. 90, 438 (1957). It is a yellow crystalline solid, readily prepared by spontaneous coupling, in water or chloroform solution, of sodium cyanodithioformate which is itself prepared by the reaction of sodium cyanide with carbon disulfide. The other reactant, perchloryl fluoride, is a gas boiling at −47° C. and is prepared by the electrolysis of sodium perchlorate in hydrogen fluoride or by the fluorination of potassium chlorate. It is thermally stable and is not hazardous to handle.

The relative proportions of the two reactants is not critical. For the purpose of achieving good conversions, however, it is desirable to use at least one mole of perchloryl fluoride per mole of 1,2-dicyano-1,2-disodiothioethylene, and preferably the perchloryl fluoride is used in slight-to-moderate excess. In this connection, the end point of the reaction is readily determined by the facts that the formation of solid inorganic salts ceases when all the dicyanodisodiothioethylene has reacted and that the transient deep red color initially developed disappears.

As the reaction medium, there may be used any substantially anhydrous material, liquid at the operating temperature, which dissolves the reactants to at least some extent, e.g., 1% by weight. The diluent should be essentially unreactive towards the reactants under the operating conditions. For this purpose, the diluent should be free of active hydrogen and active halogen. Active hydrogen is defined here as hydrogen detectable by the well-known Zerewitinoff test. Active halogen is halogen precipitated by silver nitrate under the conditions of the test described by Shriner, Fuson and Curtin in "Systematic Identification of Organic Compounds," 4th ed., pp. 136–147.

Suitable reaction media include acyclic or cyclic ethers such as diethyl ether, di-n-butyl ether, 1,2- dimethoxyethane, 1,2-diethoxyethane, tetrahydrofuran, dioxan, anisole, etc.; nitriles such as acetonitrile, propionitrile, n-butyronitrile, benzonitrile, etc.; sulfoxides or sulfones such as dimethyl sulfoxide, tetramethylene cyclic sulfone, etc.; esters such as methyl acetate, ethyl butyrate, etc.; halohydrocarbons free of active halogen such as carbon tetrachloride, chloroform, chlorobenzene, etc.; ketones such as acetone, methyl ethyl ketone, etc.; and the like. Ethers are preferred diluents for use in this reaction. The amount of liquid diluent is immaterial provided it is sufficient to maintain the dicyanodisodiothioethylene and the inorganic products which form during the reaction in suspension. In practice, there is preferably used from 2–20 parts of diluent per part of dicyanodisodiothioethylene.

The reaction is exothermic and can proceed at temperatures as low as −20° C. It is preferably carried out in the temperature range of 0 to 50° C. If desired, moderate external heating can be applied, e.g., up to 150° C. The reaction is most conveniently carried out at or near atmospheric pressure by passing the gaseous perchloryl fluoride through the liquid reaction medium containing the dicyanodisodiothioethylene in suspension or partial solution. The reaction can also be conducted in pressure vessels at the autogenous pressure developed by the reactants. Stirring or agitation is beneficial, though not essential.

Tetracyano-1,4-dithiin is conveniently isolated by filtering off the inorganic reaction products and evaporating the organic reaction medium, in which it is generally soluble. If the reaction medium is not an active solvent for the tetracyano-1,4-dithiin, the latter can be recovered by extracting the inorganic reaction products with a suitable solvent. It can be purified, if necessary, by conventional methods such as recrystallization, selective absorption on solid absorbents and the like.

The invention is illustrated in greater detail by the following examples, in which parts are by weight:

Example 1

A suspension of 10.0 parts of 1,2-dicyano-1,2-disodiothioethylene in 70 parts of 1,2-dimethoxyethane was cooled to 0° C. Perchloryl fluoride gas was passed into the cooled and stirred mixture at such a rate that the temperature did not exceed 5° C. The reaction was exothermic, producing a transient, deep red color which faded near the end of the reaction. The reaction was continued until there was no further appreciable formation of inorganic salts. The mixture was then allowed to warm to 25° C., and the precipitated inorganic salts were removed by filtration. Evaporation of the filtrate in a stream of nitrogen left a dark solid residue, which was extracted with hot toluene. Cooling of the toluene solution gave a precipitate of brown crystals, which were redissolved in ethyl acetate. Treatment of the ethyl acetate solution with 200 parts of acid alumina removed the colored impurities and gave 5.1 parts (88% yield) of 1,4-dithia - 2,3,5,6 - tetracyanocyclohexa - 2,5 - diene, i.e., tetracyano-1,4-dithiin, M.P. 205–206° C.

Example 2

1,4-dithia-2,3,5,6-tetracyanocyclohexa - 2,5 - diene, i.e., tetracyano-1,4-dithiin, (110 parts) was heated for 15 minutes at 210–220° C. in an open glass tube. Sulfur sublimed from the melt to the cold portions of the tube. The tube was cooled and its contents were triturated with carbon bisulfide, which dissolved the sulfur, leaving a crystalline residue. This solid was collected by filtration, washed well with carbon disulfide and sublimed by heating under reduced pressure. There was obtained 75 parts (80% yield) of essentially pure tetracyanothiophene as white crystals, M.P. 198° C.

*Analysis.*—Calc'd for $C_8N_4S$: C, 52.16; N, 30.42. Found: C, 52.49; N, 31.63.

This product showed absorption maxima at 281 and 239 millimicrons in the ultraviolet spectrum.

Tetracyano-1,4-dithiin and tetracyanothiophene are useful as intermediates in the preparation of a number of technically valuable products. They are capable of reacting with aromatic or heterocyclic amines or azomethines to give dyes. For example, reaction of tetracyano-1,4-dithiin in dimethyl sulfoxide or dimethyl formamide with the N,N-dimethylhydrazone of furfural or of pyrrole-2-carboxaldehyde gives solid materials, red or magenta in color, which absorb strongly in the visible spectrum with maximum absorption at about 500 millimicrons. These products are effective in the dyeing of textile materials when applied from neutral or slightly basic media. By reaction with cuprous chloride in 1,2,4-trichlorobenzene at 190° C., the two compounds listed immediately above give intensely colored dark green-black solids whose spectral characteristics indicate them to be novel types of percyano copper phthalocyanines, useful as pigments in the same manner as the known phthalocyanines.

In the presence of alkali, moist or dilute, such as dilute sodium or potassium hydroxide, tetracyano-1,4-dithiin slowly decomposes with the evolution of hydrogen cyanide. Thus, when deposited from alkaline suspension, e.g., by spraying, on living plants or on insect nests, it acts as an effective insect poison for extended periods of time, or can be used in fumigation treatments.

The reaction by which tetracyano-1,4-dithiin is prepared can be viewed as proceeding in accordance with the equation

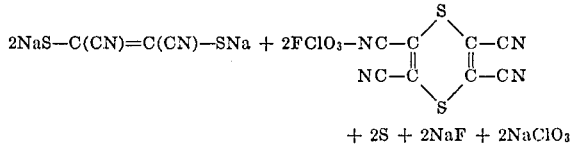

$$2\text{NaS}-\text{C(CN)}=\text{C(CN)}-\text{SNa} + 2\text{FClO}_3 \rightarrow$$
$$+ 2\text{S} + 2\text{NaF} + 2\text{NaClO}_3$$

Tetracyano-1,4-dithiin shows absorption maxima at 332, 317.5, 278 and 244 millimicrons in the ultraviolet spectrum.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The process which comprises contacting 1,2-dicyano-1,2-disodiothioethylene with perchloryl fluoride in an anhydrous liquid reaction medium and thereby forming tetracyano-1,4-dithiin.

References Cited

UNITED STATES PATENTS 2,991,292   7/1961   Degener et al. _____ 260—327

OTHER REFERENCES

Parham et al. I: Jour. Amer. Chem. Soc., vol. 76 (1954), pp. 4960–1.

Parham et al. II: Jour. Amer. Chem. Soc., vol. 77 (1955), pp. 68–9.

Loudon et al.: J. Chem. Soc. (1957), pp. 3814–5.

Wynberg et al.: Jour. Amer. Chem. Soc., vol. 79 (1957), pp. 1972–3.

Kirmse et al.: Annalen der Chemie, vol. 614 (1958), p. 11.

JAMES A. PATTEN, *Primary Examiner.*